United States Patent [19]

Sonobe

[11] Patent Number: 5,265,928
[45] Date of Patent: Nov. 30, 1993

[54] ROBOT HAND

[75] Inventor: Masao Sonobe, Iwata, Japan

[73] Assignee: Yamaha Motor Co., Ltd., Shizuoka, Japan

[21] Appl. No.: 798,701

[22] Filed: Nov. 29, 1991

[51] Int. Cl.$^5$ .............................................. B66C 1/00
[52] U.S. Cl. ................................. 294/86.4; 294/119.4
[58] Field of Search ........................... 294/86.4, 119.4; 901/30, 31, 45, 49; 403/224, 225, 220

[56] References Cited

U.S. PATENT DOCUMENTS

| 3,525,547 | 8/1970 | Hiseler et al. ................... 294/119.4 |
| 4,276,697 | 7/1981 | Drake et al. . |
| 4,338,052 | 7/1982 | Lockett . |
| 4,573,728 | 3/1986 | Johnson ........................... 294/119.4 |
| 4,820,114 | 4/1989 | Inaba et al. . |
| 4,822,200 | 4/1989 | Berner ............................. 294/86.4 X |

FOREIGN PATENT DOCUMENTS

| 3710381 | 10/1988 | Fed. Rep. of Germany . |
| 3710688 | 10/1988 | Fed. Rep. of Germany . |
| WO81/03518 | 12/1981 | PCT Int'l Appl. . |
| 2152473 | 8/1985 | United Kingdom . |

Primary Examiner—Joseph D. Pape
Attorney, Agent, or Firm—Finnegan, Henderson, Farabow, Garrett & Dunner

[57] ABSTRACT

A robot hand that comprises a coupling member releasably mounted on a robot body and a holding member for holding a workpiece. The coupling member and the holding member are coupled through elastic members so that external force and vibration received by the workpiece can be absorbed by the elastic members.

6 Claims, 2 Drawing Sheets

ROBOT HAND

BACKGROUND OF THE INVENTION

The invention relates to a robot hand that allows a robot to perform operations such as sand removing and cutting in molding.

For example, in molding, the removal of molding sand from a finished product and cutting off its unnecessary parts are performed by dedicated machines.

However, such conventional technique using special machines requires a plurality of machines dedicated to respective types of work, hence elevating the cost and reducing the operation efficiency.

While it is conceivable to employ robots in place of dedicated machines, the use of robots for sand removal and cutting, which involve large external force and vibration, leads to the problem that the robots are likely to break down due to their exposure to such external force and vibration.

SUMMARY OF THE INVENTION

The invention has been made in view of the above circumstances. Accordingly, an object of the invention is to provide a robot hand that permits a robot to perform operations involving external force and vibration by preventing the transmission of the external force and vibration to the robot body.

To achieve the above object, a robot hand is used that includes a coupling member releasably mounted on a robot body and a holding member for holding a workpiece. The coupling member and the holding member are coupled through elastic members.

According to the invention, even if the workpiece held by the holding member receives external force and vibration, the external force and vibration are effectively absorbed by the elastic members that couple the holding member with the coupling member. Therefore, transmission of the external force and vibration to the robot body is shut off, thus precluding the likelihood that the robot body will fail while being affected by the external force and vibration. As a result, operations such as sand removal and cutting in molding can be performed by a robot, thereby allowing the operation efficiency to be improved and achieving a cost reduction.

DETAILED DESCRIPTION OF THE PREFERRED EMBODIMENT

An embodiment of the invention will now be described with reference to the accompanying drawings.

Figure 1:
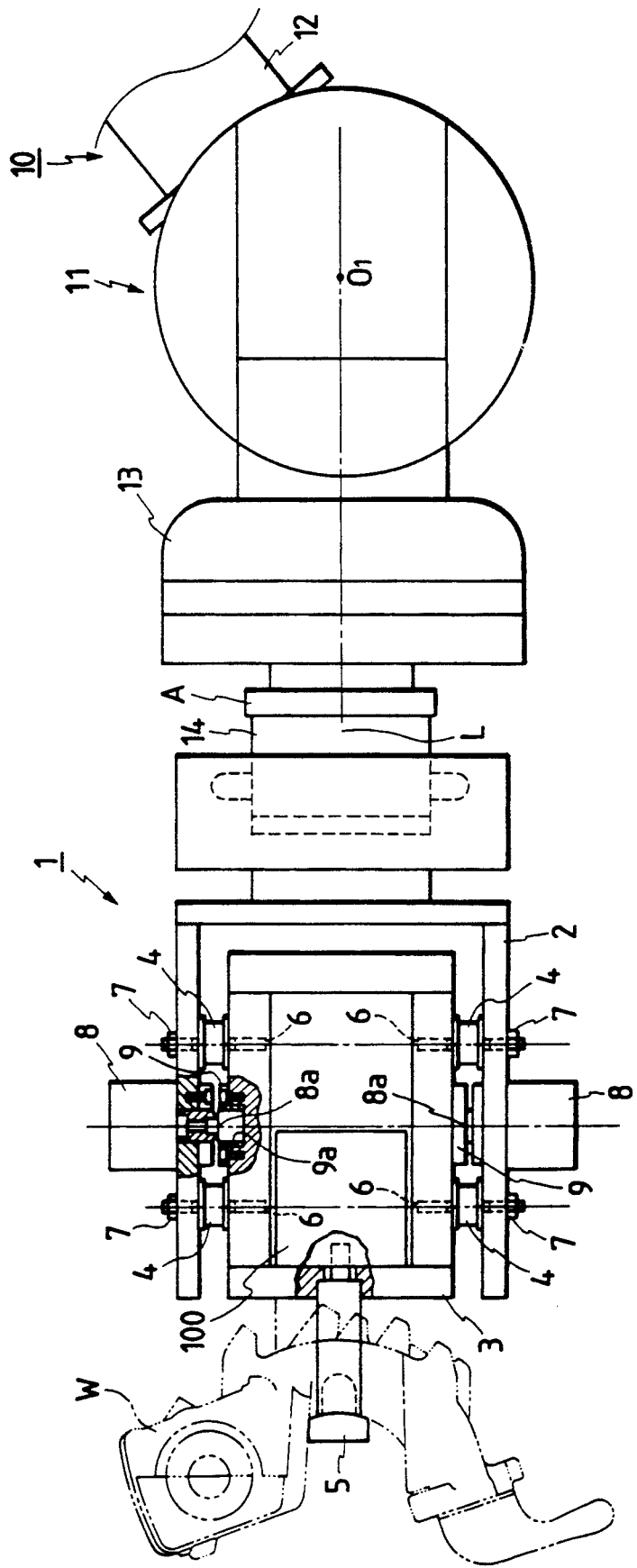
FIG. 1 is a partial sectional view of a robot hand according to the present invention.
Figure 2:
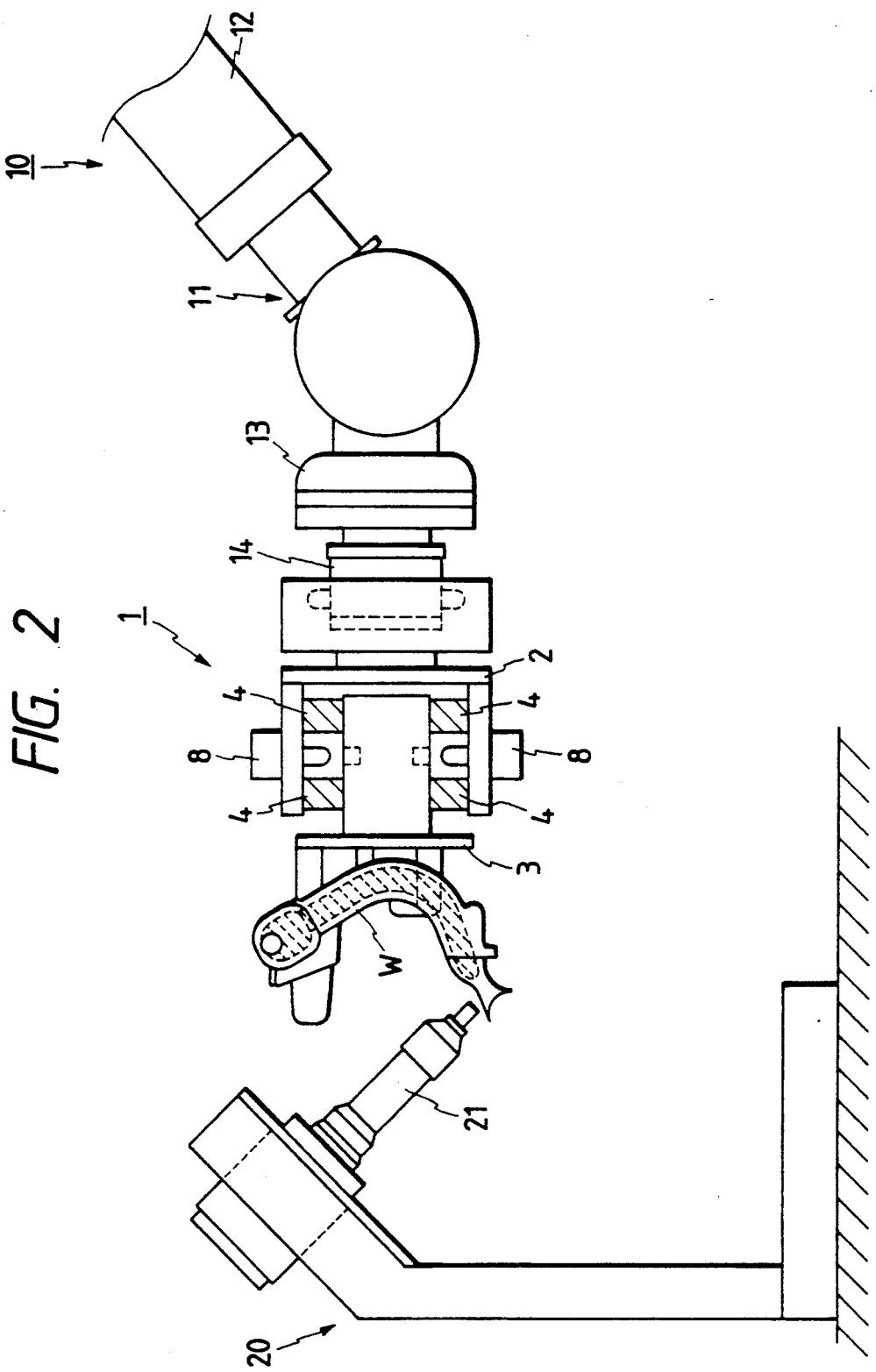
FIG. 2 is a partial sectional side view of an operation using a robot according to the present invention.

FIG. 1 is a partial sectional view of a robot hand according to the present invention, and FIG. 2 is a partial sectional side view showing an operation using a robot according to the present invention.

In FIG. 1, reference numeral 10 designates a vertical articulated industrial robot. A rotatable α-shaft 13 is provided on an end of an arm 12 of the robot body 11, the α-shaft 13 being connected to an auto hand changer (AHC) 14 that automatically engages and disengages a robot hand 1 of the invention.

As shown in FIG. 1, the robot hand 1 is rotatable about an axis $O_1$ which is perpendicular to the paper surface of FIG. 1, and a mounting portion A of the auto hand changer (AHC) 14 is rotatable about an axis L which is disposed longitudinally through of the mounting portion A.

In the robot hand 1, reference numeral 2 designates a coupling member that is removably mounted on the auto hand changer 14. On an end of the coupling member 2 is a holding member 3 that is elastically supported through four (4) vibration isolating rubber pieces 4. The holding member 3 is a jig for holding a workpiece W (a manifold of an internal combustion engine in the illustrated example). More specifically, the holding member 3 is arranged inside the coupling member 2 with a predetermined gap interposed therebetween. Each of the upper and lower gaps is maintained by two (2) of the vibration isolating rubber pieces 4, so that the coupling member 2 and the holding member 3 are vertically supported elastically. As shown in FIG. 1, each vibration isolating rubber piece 4 maintaining the upper gap is coaxial with a corresponding vibration isolating rubber piece 4 maintaining the lower gap. On an end of the coupling member 2 the workpiece W is held by a pin 5. Each vibration isolating rubber piece 4 is secured by a bolt 6 and a nut 7. The pin 5 is reciprocatably driven by a cylinder 100 in such a manner that the workpiece W is held by the pin 5.

On the upper and lower portions of the coupling member 2 cylinders 8 are provided so as to oppose each other, and the rod 8a of each cylinder 8 vertically reciprocates by passing through the coupling member 2. If each cylinder 8 is driven to cause the rod 8a to extend from the position shown in FIG. 1, then each rod 8a is tightly fitted within a circular hole 9a of a flange-like positioning member 9 that is mounted on the holding member 3. In addition, the rods 8a are arranged coaxially.

The operation of the robot hand 1 of the invention will be described next, taking as an example the case where sand removing in molding is performed using the robot 10.

As shown in FIG. 2, the workpiece w is supported by the arm 12 of the robot 10 through the robot hand 1. When vibration is applied to the workpiece W by an impact hammer 21 of a vibrator 20, the molding sand filled within the workpiece W is shaken down by the vibration.

In this case, the holding member 3 of the robot hand 1 which holds the workpiece W starts vibrating together with the workpiece W to receive the external force from the impact hammer 21. However, the vibration isolating rubber pieces 4 are interposed between the holding member 3 and the coupling member 2 and, as a result, the external force and vibration received by the holding member 3 can effectively be absorbed by the vibration isolating rubber pieces 4. Thus transmission of the external force and vibration toward the coupling member 2 is suppressed. Therefore, the transmission of the external force and vibration to the robot body 11 can be obviated, thereby eliminating the shortcoming that the robot body 11 is susceptible to breakdown due to its being exposed to the external force and vibration. As a result, the robot 10 can be employed for the operations of removing sand and cutting which involve large external force and vibration in molding, and this contributes to improving the operation efficiency and reducing the cost compared to the case where dedicated machines are employed in conventional molding operations.

Some operations require that the workpiece W be rigidly supported. In such a case, the cylinders 8 are driven, as described previously, to bring the respective rods 8a into tight engagement with the circular holes 9a of the positioning members 9. As a result, the coupling member 2 and the holding member 3 can be rigidly coupled with each other, which in turn allows the workpiece W to be rigidly supported with respect to the robot body 11.

As is apparent from the foregoing description, the invention is constructed by coupling the coupling member removably mounted on the robot body with the holding member holding the workpiece through the elastic members. As a result of the construction, the transmission of external force and vibration to the robot body can be shut off, thereby providing the advantage that the operations involving external force and vibration can be performed by a robot.

What is claimed is:

1. A robot hand comprising:
    a coupling member releasably mounted on a robot body;
    a holding member for holding a workpiece;
    means for selectively supporting said holding member rigidly on said coupling member; and
    means for selectively supporting said holding member elastically on said coupling member when said means for selectively supporting said holding member rigidly is not rigidly supporting said holding member.

2. A robot hand according to claim 1, wherein said means for selectively supporting said holding member elastically comprises a plurality of vibration isolating rubber pieces disposed between said coupling member and said holding member.

3. A robot hand comprising:
    a coupling member releasably mounted on a robot body;
    a holding member for holding a workpiece;
    means for selectively supporting said holding member elastically on said coupling member; and
    means for selectively supporting said holding member rigidly on said coupling member including two cylinders coaxially disposed on said coupling member and opposing each other, two coaxially disposed rods, each of said rods being slidably supported within a corresponding one of said cylinders, and two positioning members disposed on said holding member, each of said positioning members defining a hole therethrough for securely receiving a corresponding one of said rods when said rods are slidably extended from said cylinders.

4. A robot hand according to claim 3, wherein each of said rods are extendable to pass through said coupling member.

5. A robot hand according to claim 3, wherein said means for selectively supporting said holding member elastically comprises a plurality of vibration isolating rubber pieces disposed between said coupling member and said holding member.

6. A robot hand according to claim 1, wherein said means for selectively supporting said holding member rigidly on said coupling member includes two coaxially disposed rods slidably mounted on said coupling member for rigidly engaging said holding member, said means for elastically supporting said holding member on said coupling member supporting said holding member when said rods are not rigidly engaging said holding member.

* * * * *